Jan. 15, 1935.   P. H. DUSSUMIER DE FONBRUNE   1,987,734
METHOD AND APPARATUS FOR WORKING GLASS
Filed April 24, 1933    4 Sheets-Sheet 1

INVENTOR
Pierre Henry Dussumier de Fonbrune
BY
ATTORNEY

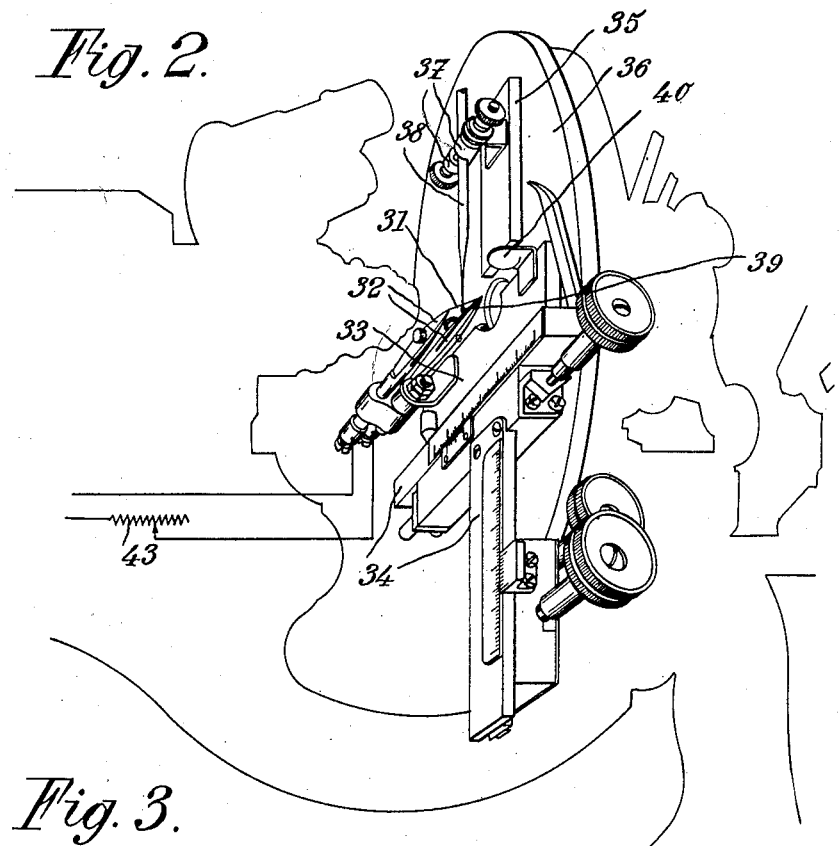
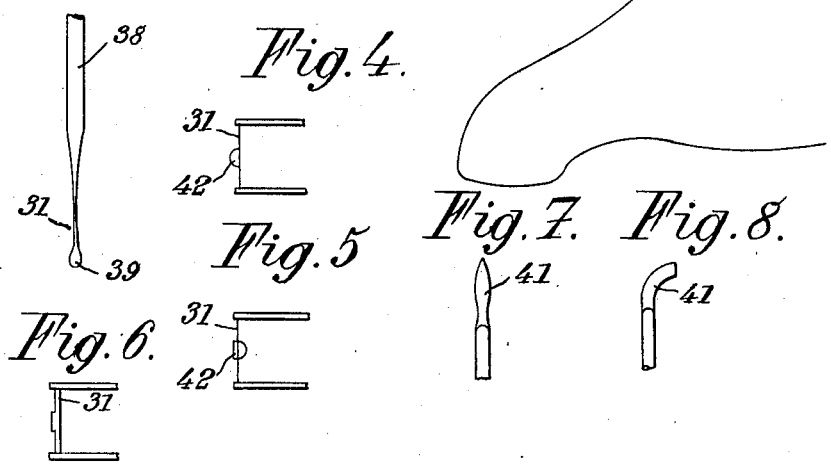

Jan. 15, 1935.  P. H. DUSSUMIER DE FONBRUNE  1,987,734
METHOD AND APPARATUS FOR WORKING GLASS
Filed April 24, 1933  4 Sheets-Sheet 3

INVENTOR.
Pierre Henry Dussumier de Fonbrune
BY
ATTORNEY

Jan. 15, 1935.   P. H DUSSUMIER DE FONBRUNE   1,987,734
METHOD AND APPARATUS FOR WORKING GLASS
Filed April 24, 1933    4 Sheets-Sheet 4

INVENTOR
Pierre Henry Dussumier de Fonbrune
BY
ATTORNEY

Patented Jan. 15, 1935

1,987,734

UNITED STATES PATENT OFFICE 1,987,734

METHOD AND APPARATUS FOR WORKING GLASS

Pierre Henry Dussumier de Fonbrune, Boulogne-sur-Seine, France

Application April 24, 1933, Serial No. 667,754
In Belgium April 28, 1932

9 Claims. (Cl. 49—7)

My invention relates to methods and apparatus for working glass (or any other fusible material) and especially for drawing it in order to obtain very fine needles or other pieces for biological experiments.

The object of my invention is to so improve these methods and apparatus as to allow of obtaining a higher precision than it was possible up to this time.

To this effect, according to my invention, I make use, for heating the glass while it is being worked, of an electric resistance so that heating is strictly localized and preferably adjustable at will, said resistance (or the element to be worked) being rigidly fixed to a movable carriage adapted to be fixed on a microscope. In that way the working of the glass can be performed and watched in the field of the objective of said microscope.

Preferred embodiments of my invention will be hereinafter described with reference to the appended drawings given merely by way of example, and in which:

Fig. 2 is a perspective view of a system of the same kind shown in a different position, for the manufacturing of very pointed hollow injection needles or capillary tubes of very small diameter;

Fig. 3 is an elevational view of a glass element adapted to be drawn by means of the device shown in Fig. 2 in order to obtain a hollow needle;

Figs. 4, 5 and 6 are elevational views of electric resistances adapted to be used in connection with the devices of Figs. 1 and 2;

Figs. 7 and 8 are elevational views of two glass elements adapted to be obtained by means of the devices above referred to;

Figure 1:
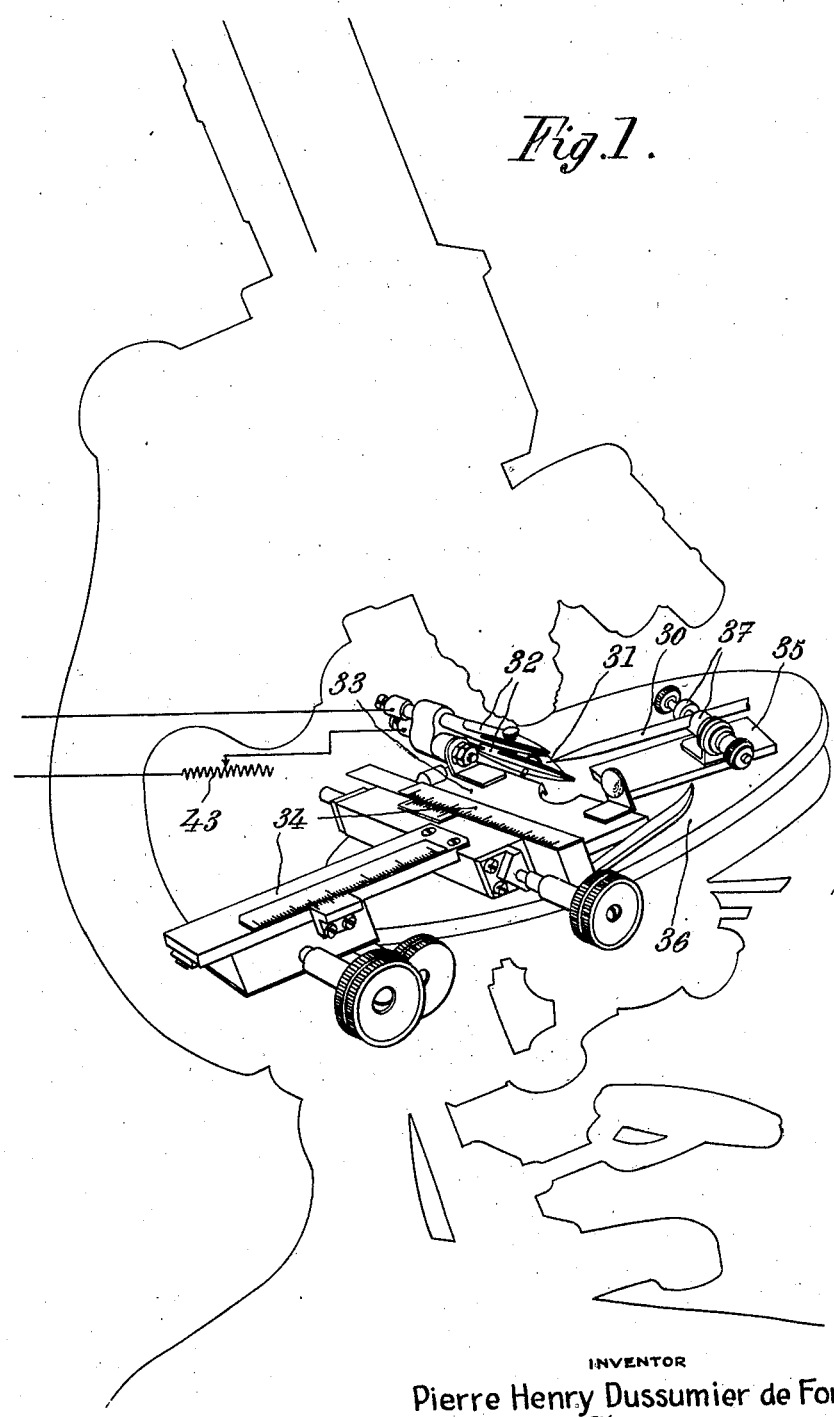
Fig. 1 is a perspective view of a microscope and of devices permitting to manufacture very pointed solid needles, especially for purposes of microscopy experiments, said devices being made according to my invention.

The glass pieces that are to be manufactured by means of the apparatus according to the present invention consist chiefly of very fine glass needles or similar articles for biological experiments, the inscribing of graphs, and micro-manipulations in general. Said needles are more especially intended to be used in connection with apparatus of the kind of those described in my co-pending application, filed of even date.

For working the glass, I make use of an electric resistance preferably of small section, and adapted to produce a very intense and localized heat which may be regulated at will. Said resistance (or the element to be worked) is carried by a movable carriage adapted to be moved in the field of a microscope so that the working of the glass may be watched through the objective of said microscope.

Supporting first that it is desired to obtain a very fine solid needle, I start from a pointed glass element 30 (Fig. 1) obtained through any suitable method, and I dispose this element in such manner that its end comes into contact with an electric resistance, consisting for instance of a very fine wire 31 of iridioplatinum, or any other suitable material. Then, when a drop of melted glass has gathered about said filament, the heating apparatus is moved away therefrom in a suitable direction, the drawing of glass taking place progressively.

Of course, the resistance may remain stationary, and in this case it is the object to be worked that is carried by the movable carriage. I may also move both the resistance and the element to be drawn, as it will be hereinafter explained.

In order that said drawing operation may be visible through the microscope, I arrange filament 31, connected to the free ends of two conductors 32 insulated from each other, on a small plate 33 adapted to be fitted to a carriage 34 of the kind of those that are usually fitted to the stage of a microscope. Glass element 30 is supported by a small plate 35 which is placed on said stage 36, said element 30 being for instance held by jaws 37, carried by said plate 35.

The glass drawing operation can then be performed with the desired precision. Preferably, the whole is so arranged that the platinum filament 31 has a slightly inclined position with respect to the vertical direction, so that it may be seen through the objective, the instrument being focused on a certain point, for instance the middle point, of said filament.

If it is desired to obtain a hollow glass needle, of the kind of a pasteur pipette for instance, I operate as follows:

I join on a small mass of glass 39 to the lower pointed end of a hollow tube 38 (Figs. 2 and 3) held in a vertical position, I bring a heated platinum filament 31 of the kind of the one above described close to said pointed end, and I allow said pointed end, which is kept in a viscid state to be progressively stretched under the effect of the weight of part 39, until said part detaches by breaking. The glass drawing operation is then concluded.

This operation may be effected by means of the organs described with reference to Fig. 1, the microscope being then brought into a horizontal position as shown in Fig. 2.

Advantageously, I may fit on plate 35, a small cup 40 adapted to contain a small amount of liquid. At the end of the drawing operation, the pointed end of the needle is immersed in said liquid in order to verify that the orifice thereof is not stopped. If the orifice is free, the liquid rises within the needle by capillarity.

The method that has just been described, makes it possible to obtain needles of an extreme fineness by means of which injections can be made to microorganisms, or capillary tubes of very small diameter for various applications.

Of course, this method is not limited to the manufacture of needles, but it covers the manufacture of any organs made of drawn glass, for instance of lancets 41 of the kind of those shown in Figs. 7 and 8.

According to the nature of the article that is to be manufactured, the shape of resistance 31 may vary. Said resistance may consist for instance, either of a filament on which is fitted a small plate 42 of suitable shape (Figs. 4 and 5) or of a very thin small bar also of suitable shape (Fig. 6).

Anyway, this resistance is always made in such manner as to localize the heating action to a very restricted space, a result that could not be obtained up to this time through the use of flames.

Finally, the current flowing through said resistance can be controlled through any suitable rheostats such as 43 (Figs. 1 and 2).

According to another embodiment of my invention, the glass element to be drawn and the resistance are mounted on two separate carriages supported by a common plate, which it will suffice to fit on the stage of the microscope.

Figure 9:
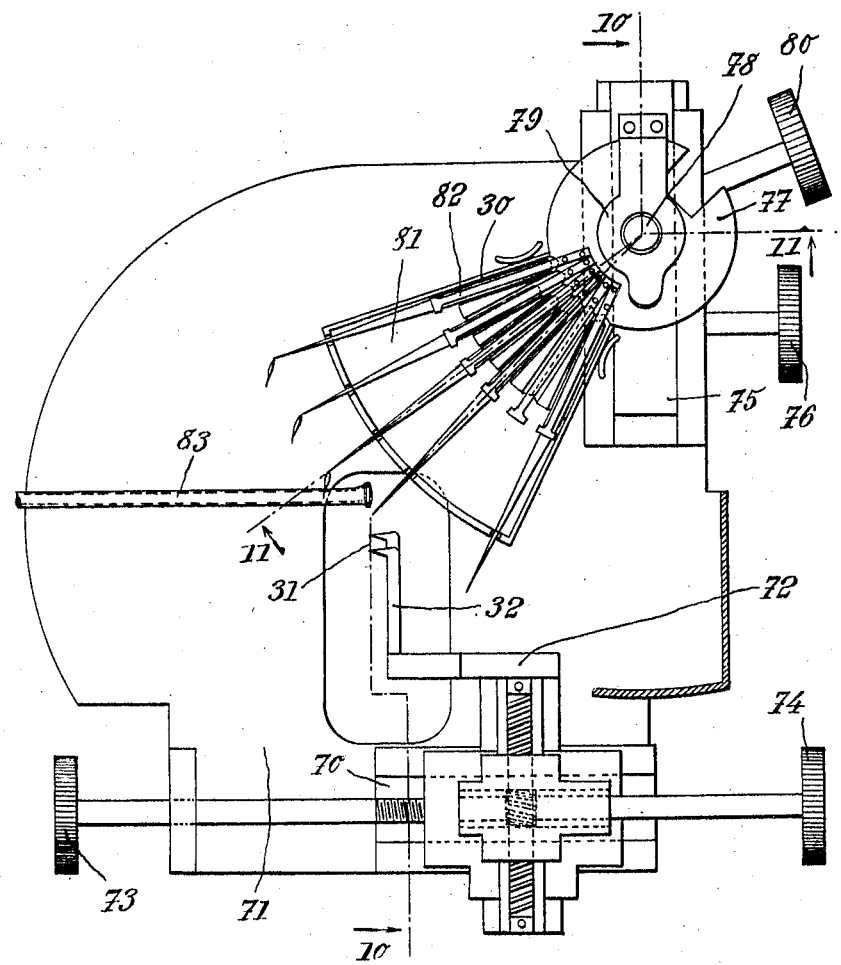
Figs. 9 to 11 are a plane view, a sectional view on the lines 10—10 of Fig. 9 and a sectional view on the lines 11—11 of Fig. 9 respectively, of devices adapted to be fitted on the plate of a microscope and to support organs permitting to draw glass elements, the whole being made according to another embodiment of my invention.
Figure 10:
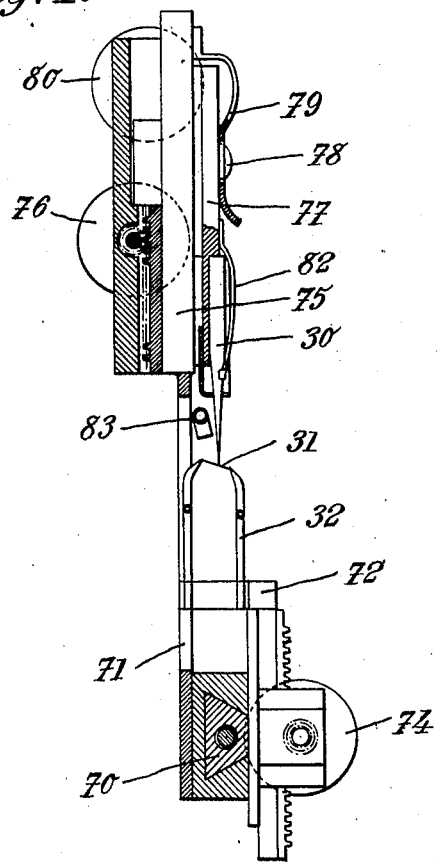
Figure 11:
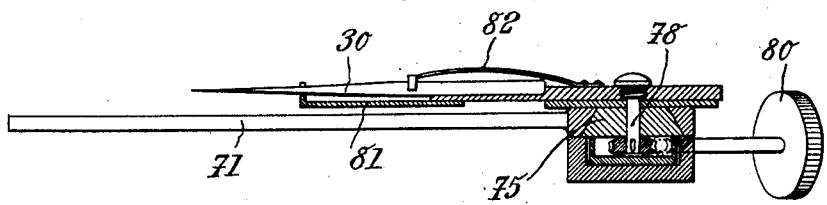

Said carriages will be made as follows (Figs. 9 to 11):

The carriage that supports the filament consists for instance of two parts, one of which, 70, is adapted to slide on the common plate 71 above referred to and the other one of which, 72, is adapted to slide with respect to part 70, the sliding displacements being controlled by means of any suitable device such as a screw and a nut, or a rack and a pinion, etc., which is controlled through milled knobs 73, 74.

Resistance 31 is for instance connected to the ends of conductors 32 fixed on piece 72.

The carriage supporting the element to be drawn may be of a similar structure, but it is believed preferable to make it in two pieces, one of which 75 slides with a translatory motion on plate 71 under the action of a knob 76, while the other one 77, which directly supports the glass element, is pivotally mounted on the first one.

Said second piece 77 will preferably be removably mounted on the axis 78 about which it pivots, a spring 79 maintaining it on said axis.

The rotation of piece 77 may be obtained through a system of pinion and tangent screw actuated by knob 80.

Advantageously, said piece 77 carries a plate 81 provided with several radial notches in which several elements 30 may be disposed and maintained by springs such as 82.

The device that has just been described makes it possible to displace both the glass element to be worked and the resistance with all the precision that is required.

In order to perform a drawing operation, I first bring the glass element to be worked into a position for which its point is close to the filament by acting on knobs 76 and 81, the axis of said filament making a certain angle with the direction of displacement of the piece 72 that carries said filament.

I then move said filament toward said glass element, by acting on knobs 73 and 74 so as to bring it into contact with said point.

Finally, I move it in the opposite direction so as to stretch the melted glass. In view of the angular position of the glass element, its point will then be both bent and drawn, the bent shape being especially convenient for manipulations in the field of a microscope.

According to another feature of my invention, I may provide in the vicinity of the filament, aerating and blowing means for permitting to further localize the heating action. Said means may for instance, consist of a tube 83 conveying air under pressure (or even another gas, for instance carbonic-acid gas cooled after expansion) which tube may be provided with means for regulating the output of gas and may be for instance rigidly fixed to the carriage of the filament.

The blowing of air also permits to avoid heating the lenses of the microscope.

While I have described what I deem to be practical and efficient embodiments of my invention it should be well understood that I do not wish to be limited thereto as there might be changes made in the arrangement, disposition and form of the parts without departing from the principle of my invention as comprehended within the scope of the appended claims.

What I claim is:

1. A device for the working of very fine glass elements, which comprises in combination, a plate adapted to be placed on the stage of a microscope, two conductors insulated from each other mounted on said plate and adapted to be connected to the terminals of a source of current respectively, a metallic filament connected at either end to one of said conductors respectively, a plate adapted to support the glass element to be worked, and means for moving said plates with respect to each other.

2. A device for the working of very fine glass elements which comprises in combination, a first plate, two conductors insulated from each other mounted on said plate and adapted to be connected to the terminals of a source of current respectively, a metallic filament connected at either end to one of said conductors respectively, a second plate adapted to support the glass element to be worked, and a carriage for the first plate adapted to be fixed to the stage of a microscope for moving said first plate with respect to said second plate.

3. A device for the working of very fine glass elements which comprises in combination, a first plate, two conductors insulated from each other mounted on said plate and adapted to be connected to the terminals of a source of current respectively, a metallic filament connected at either end to one of said conductors respectively, a second plate adapted to support the glass element to be worked, a third plate adapted to be fixed to the stage of a microscope, and two carriages fitted to said third plate and adapted to move said two first mentioned plates respectively on the third mentioned plate.

4. A device for the working of very fine glass elements which comprises in combination, a first plate, two conductors insulated from each other mounted on said plate and adapted to be connected to the terminals of a source of current respectively, a metallic filament connected at either end to one of said conductors respectively, a second plate adapted to support the glass element to be worked, a third plate adapted to be fixed to the stage of a microscope, a carriage fitted to said third plate for sliding said first plate with respect to said third plate, a carriage adapted to be fitted to said third plate for rotating the second plate with respect to said third plate, and means for fixing a plurality of glass elements on said second plate.

5. A device according to claim 1 further comprising, means for blowing a cooling gas on said resistance so as to further localize the heating action thereof.

6. A device for working a glass element for the manufacturing of very fine glass articles, which comprises in combination, a support for said glass element, a very small electric resistance, and means for moving said resistance and said support with respect to each other, whereby the glass element can be brought into contact with the electric resistance so as to form a drop of melted glass, and the support and resistance moved away from each other so as to draw the melted glass into the desired shape.

7. A method of producing a very fine glass article which comprises bringing a mass of glass and a source of heat of reduced dimensions in contact with each other, so as to form a small drop of melted glass on said glass mass, and subsequently moving said glass mass and said source of heat away from each other, whereby said drop of melted glass is drawn by the relative movement of said source of heat with respect to said glass mass into a very fine form.

8. A method of producing a fine point on a glass article which comprises bringing the point of said glass article into contact with a source of heat of reduced dimensions so as to form a small drop of melted glass on said glass article, and progressively moving said glass article away from said source of heat, so as to draw said drop of melted glass between said source of heat and said glass article, whereby the pointed extremity of the drop of melted glass that is being drawn remains in contact with said source of heat.

9. A method of producing a fine point on a glass article which comprises bringing the point of said glass article into contact with a source of heat of reduced dimensions so as to form a small drop of melted glass on said glass article, and progressively moving said glass article away from said source of heat, so as to draw said drop of melted glass between said source of heat and said glass article, thereby forming a very fine glass article, and breaking said article to form a point, whereby the pointed extremity of the drop of melted glass that is being drawn remains in contact with said source of heat.

PIERRE HENRY DUSSUMIER DE FONBRUNE.